United States Patent [19]

Germond

[11] Patent Number: 4,545,274
[45] Date of Patent: Oct. 8, 1985

[54] HIP, VALLEY AND JACK RAFTER CUTTING APPARATUS

[75] Inventor: Henry S. Germond, Lake Oswego, Oreg.

[73] Assignee: Speed Cut, Inc., Corvallis, Oreg.

[21] Appl. No.: 636,496

[22] Filed: Aug. 1, 1984

[51] Int. Cl.⁴ .......................... B27B 5/20; B27B 5/04
[52] U.S. Cl. ................................ 83/486.1; 83/471.3; 83/488; 83/581; 83/404.1
[58] Field of Search .................. 83/471.3, 581, 486.1, 83/488, 404.1

[56] References Cited

U.S. PATENT DOCUMENTS

| | | | |
|---|---|---|---|
| 1,522,604 | 1/1925 | Torlinski | 83/486.1 |
| 2,489,420 | 11/1949 | Kirk et al. | 83/486.1 |
| 4,152,961 | 5/1979 | Batson | 83/486.1 X |
| 4,316,400 | 2/1982 | Mayo | 83/425.2 |
| 4,454,794 | 6/1984 | Thornton | 83/488 X |

*Primary Examiner*—Donald R. Schran
*Attorney, Agent, or Firm*—Kimmel, Crowell & Weaver

[57] ABSTRACT

Compound angle saw cuts are made with precision on lumber components in the mass production of hip, valley and jack rafters. The required cuts are made by a power-driven circular saw blade which is caused to traverse a linear guideway in one direction with the saw blade in a first angular position to produce a first compound angle cut, followed by reverse traversing of the saw blade along the linear guideway while in a second angular position perpendicular to the first angular position to produce a second compound angle cut. The saw blade, its linear guideway and operating elements are attached to a control arm forming a part of a pantograph linkage which can be driven around a sector gear having a protractor scale to establish the roof slope angle for which rafters are being cut. The sector gear is adjustable on a primary support along a linear path to allow the axis of rotation of the control arm and saw blade to be located in a reference plane defined by the top surface of a lumber component conveyor. The axis of rotation is at all times perpendicular to the linear guideway axis. The linear guideway and saw blade are also adjustable on the control arm when the saw blade is at the mid position of its angular adjustment and in a plane parallel to said axis of rotation for making square cuts through lumber components so that one face of the saw blade can be placed precisely on the axis of rotation. Lumber components are delivered in succession intermittently to a cutting station and are held at such station while the saw blade produces the compound angle cuts.

20 Claims, 14 Drawing Figures

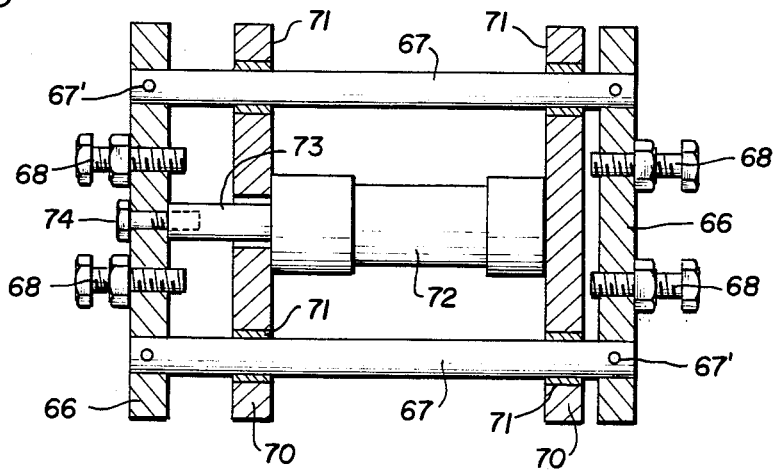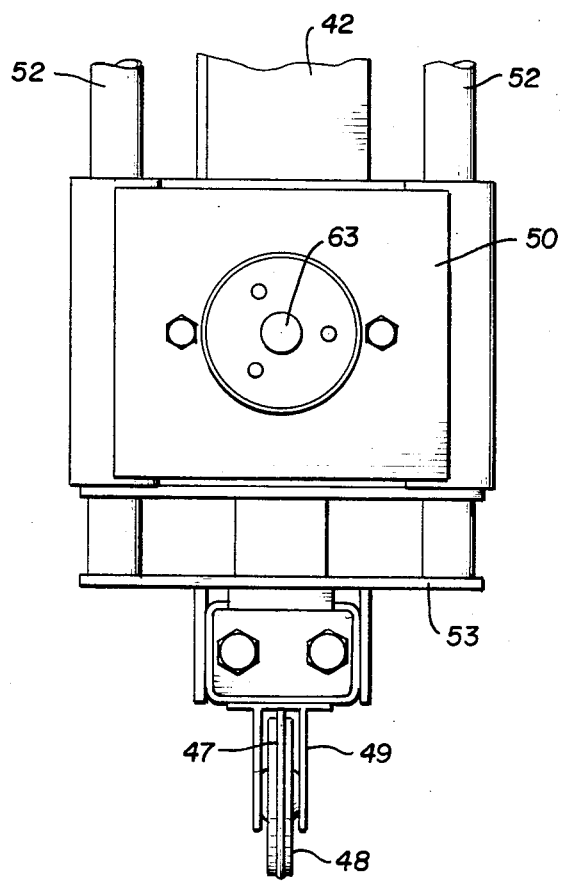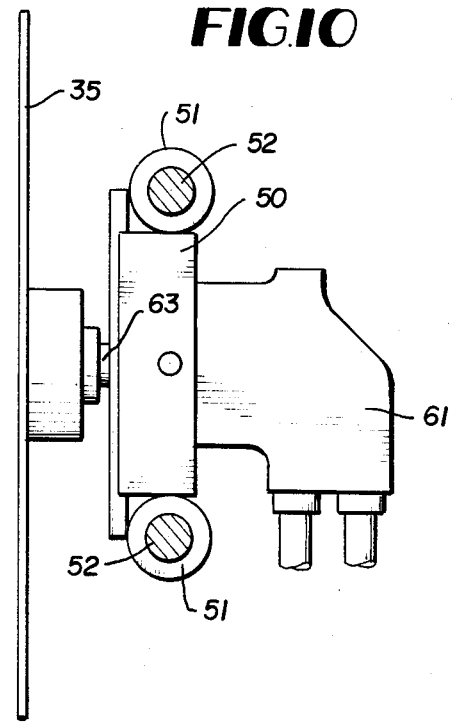

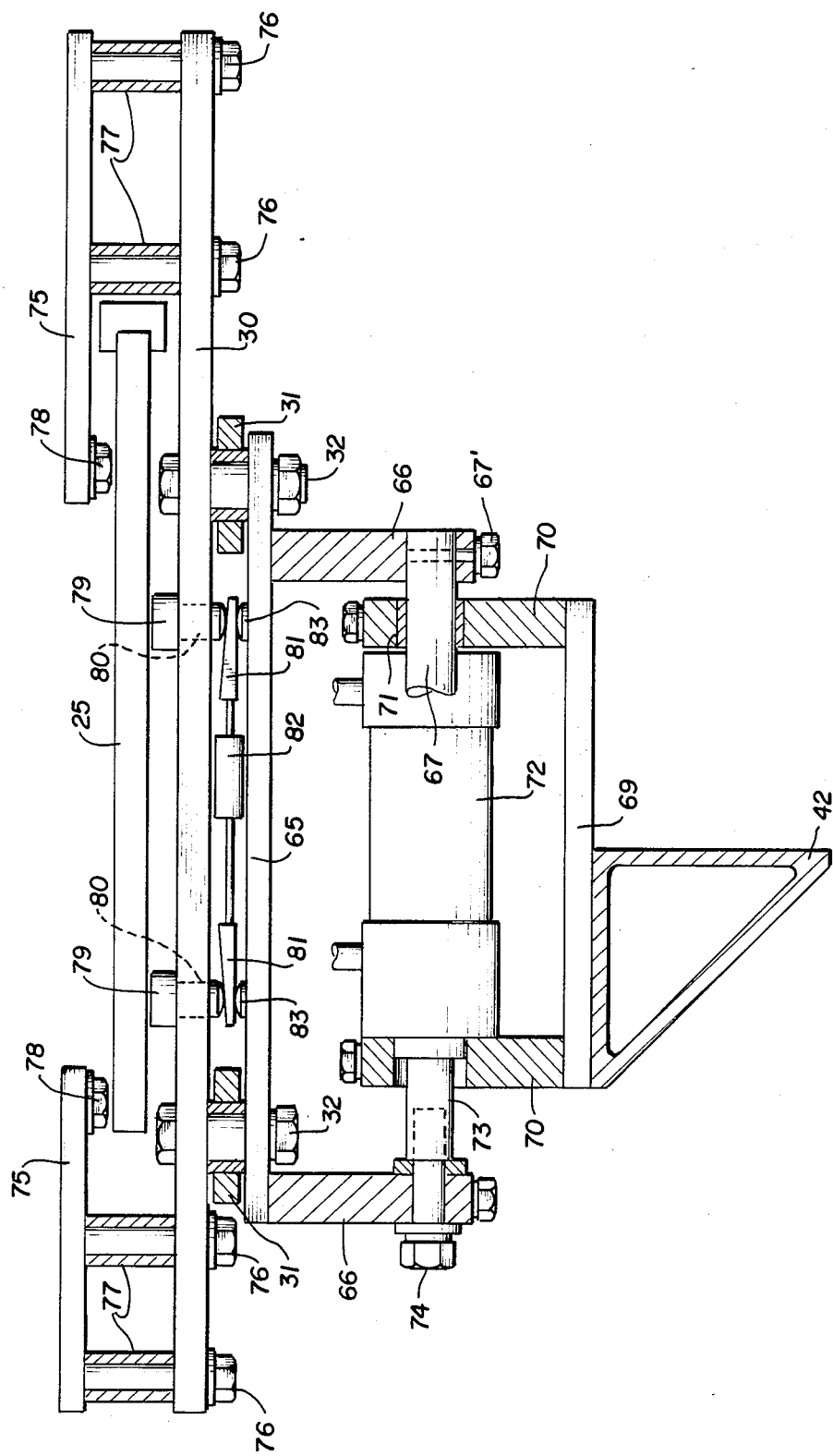

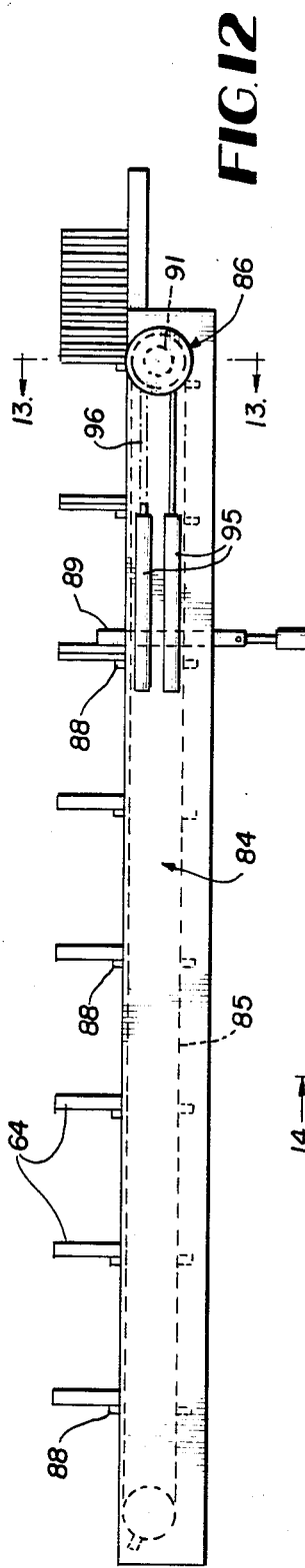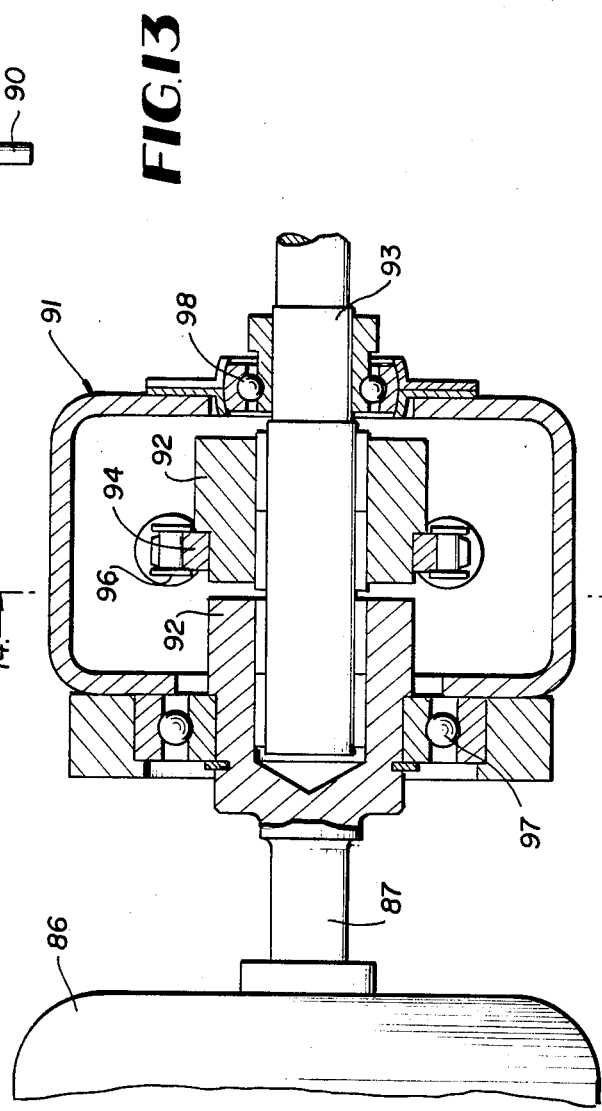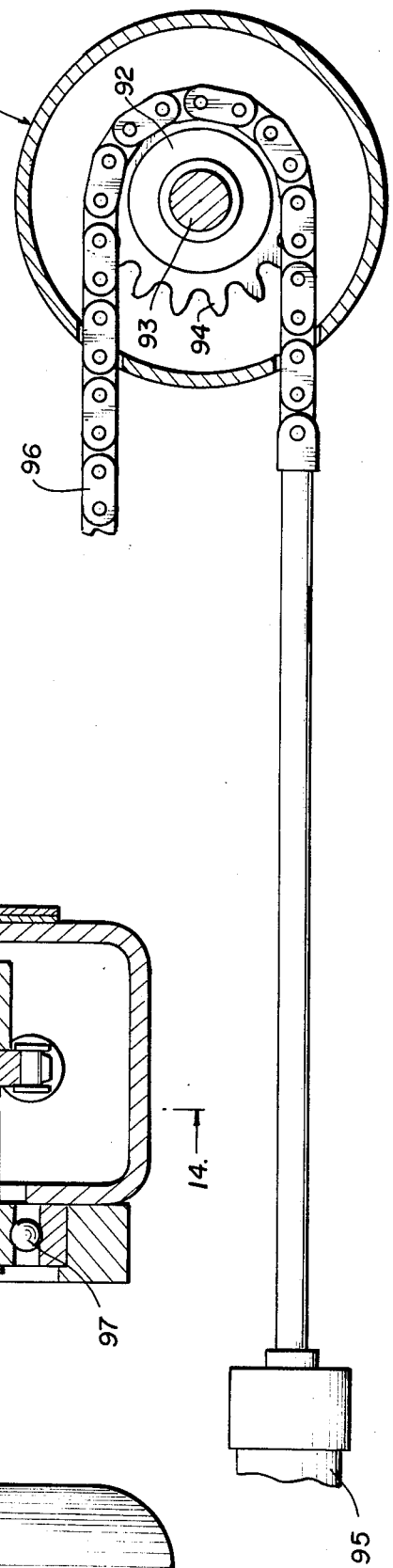

HIP, VALLEY AND JACK RAFTER CUTTING APPARATUS

BACKGROUND OF THE INVENTION

Prior art equipment for producing repetitive simple angle cuts on lumber components used to construct roof trusses and the like is known. Such equipment used for commercial production of such lumber components is typified by U.S. Pat. No. 4,316,400, issued Feb. 23, 1982 to Mayo and other patents. These prior art machines do not have the capability of making compound angle cuts on lumber components necessary for producing hip, valley and jack rafters, and it is the principal object of the present invention to provide an apparatus for this important purpose on a production basis. No known equipment is presently available for producing the compound angle cuts required to make hip, valley and jack rafters with precision and uniformity on a mass production basis, and the present invention seeks to satisfy this need in a practical, sturdy and comparatively simple and economical apparatus.

Another object of the invention is to provide a production cutting apparatus for hip, valley and jack rafters which is compatible with the apparatus in U.S. Pat. No. 4,316,400 and can be used on the patented apparatus, or can be used separately therefrom in a completely self-contained embodiment.

Still another object of the invention is to provide a power saw apparatus for making compound angle cuts on lumber components, in conjunction with a component conveyor which advances the lumber components in a stop and go mode to and away from the saw cutting position, the conveyor having overrunning clutch means in its drive system which enables it to operate continuously, if desired, as well as intermittently.

An additional object of the invention is to provide an apparatus of the above-mentioned character possessing all of the required adjustments to accurately position the saw blade relative to the lumber components being cut by the saw blade in its two modes of use for making compound angle cuts or square cuts, and also having means to lock the sector gear against movement relative to a slide plate of the apparatus to avoid inaccurate cutting of lumber components due to clearances in the pantograph linkage.

Other features and advantages of the invention will become apparent to those skilled in the art during the course of the following description.

BRIEF DESCRIPTION OF THE DRAWINGS

FIG. 8 is a vertical section taken on line 8—8 of FIG. 7.

FIG. 9 is an enlarged fragmentary section taken on line 9—9 of FIG. 5, with parts omitted.

FIG. 10 is a sectional view at right angles to FIG. 9 taken on line 10—10 of FIG. 5.

FIG. 11 is a cross section taken on line 11—11 of FIG. 5.

FIG. 12 is a partly schematic side elevation of a conveyor system forming a part of the invention.

FIG. 13 is an enlarged fragmentary vertical section taken on line 13—13 of FIG. 12.

FIG. 14 is a fragmentary vertical section taken on line 14—14 of FIG. 13.

DETAILED DESCRIPTION

Figure 4:
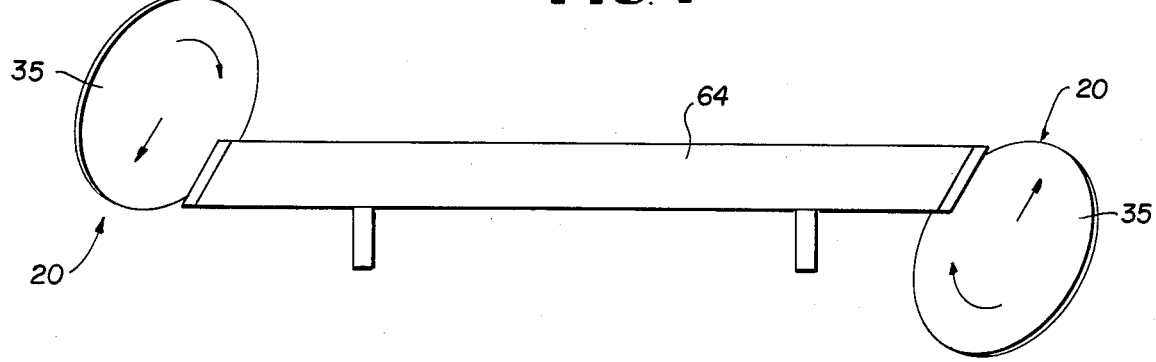
FIG. 4 is a side elevational view of the apparatus in FIG. 3.
Figure 5:
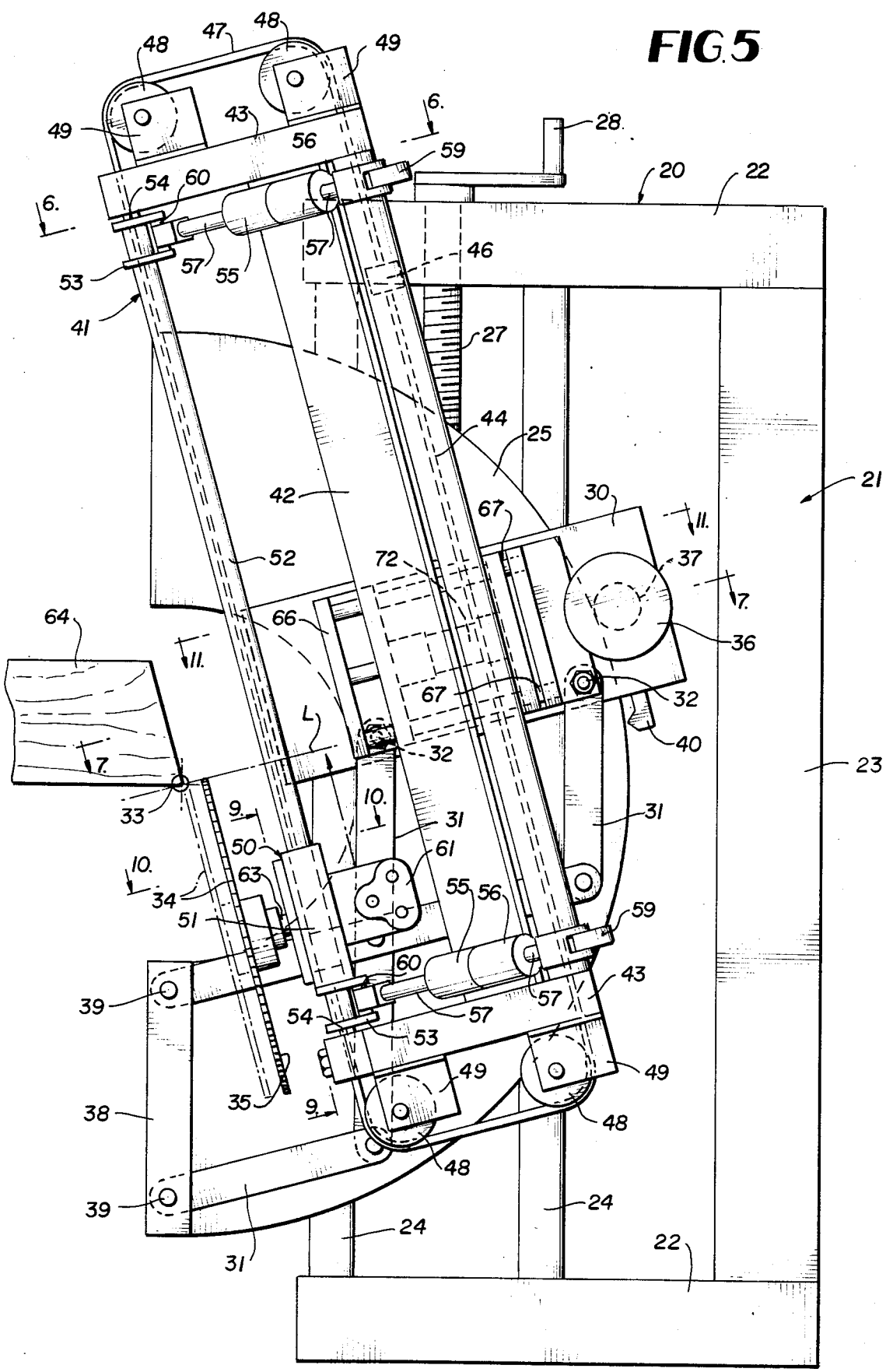
FIG. 5 is a front elevation of a single unit of the cutting apparatus according to the invention.

Referring to the drawings in detail, wherein like numerals designate like parts, FIG. 5 depicts one hip, valley and jack rafter cutting apparatus unit 20 according to the invention in its entirety. As shown schematically in FIGS. 3 and 4, a pair of the cutting apparatus units 20 will normally be employed on the apparatus disclosed in U.S. Pat. No. 4,316,400 so that the patented apparatus will have the ability to make the compound angle cuts required on hip, valley and jack rafters.

FIGS. 12 through 14 of the drawings depict a preferred conveyor system for use with the cutting apparatus 20 whereby the lumber components 64 being processed by the cutting apparatus are transported to a cutting station and held stationary while the required saw cuts are being made. The conveyor system under U.S. Pat. No. 4,316,400 transports lumber components with continuous movement toward and through the cutting saws which make simple angle cuts only on the lumber components.

The particular apparatus unit 20 according to this invention possesses the capability of being employed independently of the apparatus in the above-mentioned patent. The apparatus units 20 could be used in pairs or singly in conjunction with any suitable means for presenting each lumber component to the cutting station and holding it at such station until the compound angle cuts are made by the apparatus units 20 according to the invention.

Continuing to refer to the drawings, the cutting apparatus unit 20 comprises a primary support 21 having opposite end rigid arms 22 connected by a longitudinal frame member 23. A pair of spaced parallel linear guide bars 24 extend fixedly between the arms 22. A relatively large sector gear 25 carries support blocks 26, FIG. 7, which are guidingly engaged with the two bars 24 to allow the sector gear to be adjusted therealong with precision. The purpose of this adjustment is to enable the precision positioning of a control arm and saw blade pivot axis 33 in the plane defined by the top face of the conveyor system 84 or the bottom longitudinal edge of the lumber components 64 being processed into hip, valley or jack rafters.

The linear adjustment of the pivot axis 33 and sector gear 25 is carried out by means of a screw shaft 27 having a manual turning crank 28, the screw shaft axis being parallel to the guide bars 24 and perpendicular to the pivot axis 33. The screw shaft 27 is journaled on the arms 22 and has threaded engagement with a drive block 29, FIG. 7, fixed to the rear of sector gear 25. The described arrangement of the sector gear 25 and its mounting and linear adjustment on the primary support 21 is fully shown in U.S. Pat. No. 4,316,400.

The control arm 30 also shown in the referenced patent forms an element of a pantograph linkage 31, two links of which are attached by pivot elements 32, FIGS. 5 and 11, to the control arm 30. A straight line L, FIG. 5, drawn through the centers of the two pivot elements 32 will intersect the parallel pivot axis 33 around which the forward face 34 of the saw blade 35 will rotate when such blade is positioned as shown in FIG. 5 in a plane parallel to the pivot axis 33.

Figure 7:
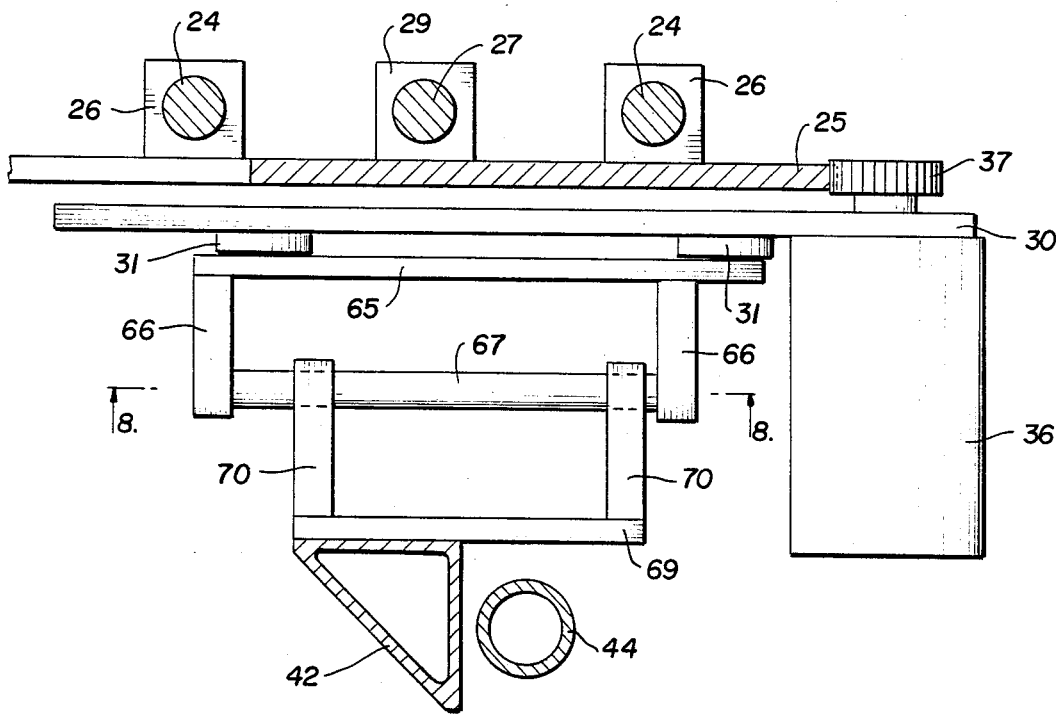
FIG. 7 is a similar view taken on line 7—7 of FIG. 5.

A drive motor 36 for the control arm 30 is fixed thereto, FIG. 7, and operates a pinion gear 37 whose teeth mesh with teeth on the sector gear 25, whereby the control arm 30 will traverse the periphery of the sector gear in the process of establishing the roof slope angle for which hip, valley and jack rafters are being mass produced. The operation of the control arm 30 and pantograph linkage 31 is fully described in the referenced patent. The pantograph linkage includes an anchor 38, FIG. 5, fixed to sector gear 25, and to which the adjacent pantograph links are connected by two pivot elements 39. The control arm 30 carries a protractor pointer 40 which follows a graduated scale on the sector gear, not shown, by means of which the roof slope angle is determined.

A rafter cutting device 41, FIG. 5, forming the heart of the present invention includes a rigid preferably triangular cross section elongated frame bar 42 having its opposite ends connected to two perpendicular arms 43. A single pneumatic cylinder 44 is fixed to the frame bar 42 by brackets 45, FIG. 6, the cylinder 44 containing a free piston 46 attached to a saw carriage drive cable 47. This cable is trained over pairs of sheaves 48, journaled on brackets 49 which are fixed to the arms 43.

The cable 47 is also connected to a saw carriage 50 having guide sleeves 51 which are slidably engaged with a pair of spaced parallel linear guide bars 52. These guide bars are arranged in spaced parallel relationship to the triangular frame bar 42 and pneumatic cylinder 44. The guide bars 52 have their ends secured to a pair of crossheads 53 pivotally connected by elements 54 to the two arms 43.

Figure 6:
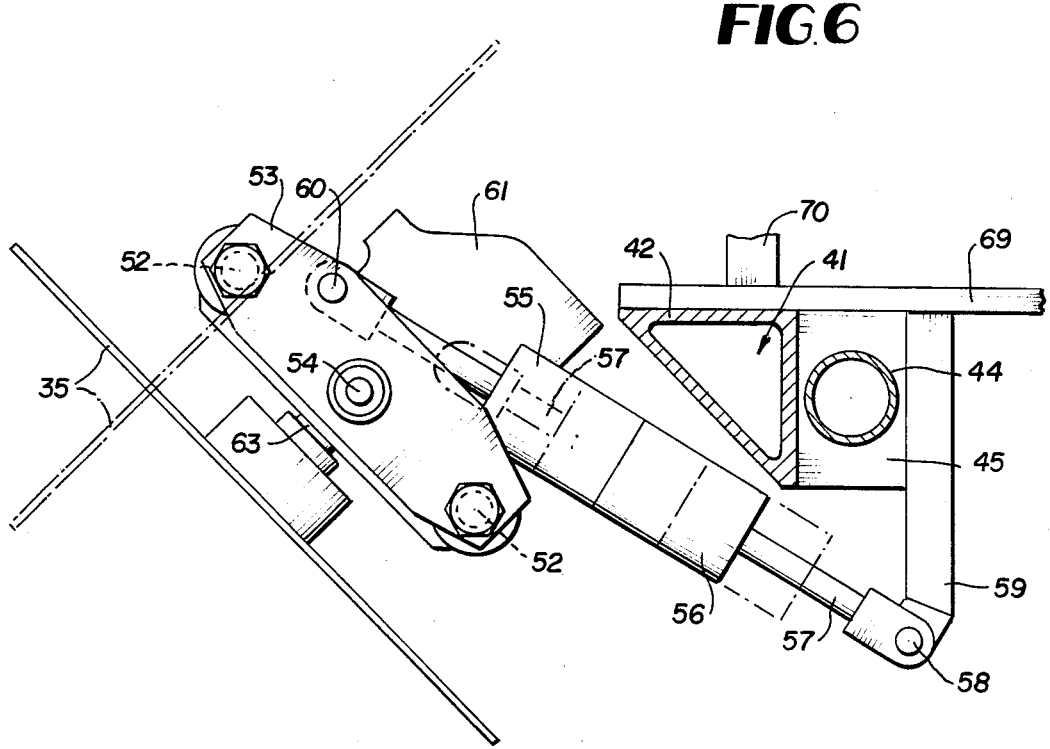
FIG. 6 is an enlarged fragmentary section taken on line 6—6 of FIG. 5.

Pairs of pneumatic cylinders 55 and 56 secured in back-to-back tandem relationship and having equal length piston rod strokes are arranged as shown in FIGS. 5 and 6. The oppositely projecting coaxial rods 57 of the cylinder pairs 55 and 56 are pivotally connected through elements 58 and 60, FIG. 6, with bracket arms 59, secured by brackets 45 to the frame bar 42 and with the crossheads 53. The described arrangement is such that simultaneous extension of the rods 57 of the back-to-back cylinder pairs 55 and 56 will rotate the crossheads 53, guide bars 52, saw carriage 50 and saw blade 35 through 90° of rotation on the axis defined by pivot elements 54. Similarly, retraction of the rods 57 of the back-to-back pneumatic cylinder pairs will rotate the crossheads 53 and associated parts 90° in the opposite direction. The two perpendicular rotated positions of the saw blade 35 are shown in FIG. 6. Simultaneous extension of either rod 57 of each back-to-back pair of cylinders 55 and 56 will rotate the crossheads 53 and associated parts through 45° of rotation. This latter 45° intermediate position of the saw blade 35 is depicted in FIG. 5. In the intermediate position shown in FIG. 5, the saw blade is used to make simple angle square cuts only on lumber components 64, and the angles of these cuts may be adjusted by changing the position of the control arm 30 on the sector gear 25.

Attached to the saw carriage 50 is a hydraulic drive motor 61 for the saw blade 35 held on the motor shaft 63. A hydraulic motor is used to power the saw blade at a rotational speed in the range of 3000–4000 RPM. This requires approximately five horsepower. The hydraulic motor 61 meeting these requirements weighs only eleven pounds. A comparable electric motor would weigh ten times as much. An air motor would also be much heavier and would lack the required speed regulation.

Similarly, the choice of the pneumatic cylinder 44 with free piston 46 and cable 47 to propel the saw carriage 50 is based on adaptability to produce rapid motions with change in direction with minimum mass and momentum. A pneumatic cylinder with piston and rod would require a large impractical overall length and much greater mass. The cable propulsion system also forms a means which need not oscillate with the saw blade as the latter is rotated with the crossheads 53 and associated parts.

A further feature of the apparatus is the provision of means shown particularly in FIGS. 8 and 11 to bodily adjust the entire cutting device 41 including saw blade 35 on the control arm 30 so that the saw blade face 34 can be placed in a common plane with the pivot axis 33 during the making of simple square cuts through lumber components 64, FIG. 5. Such cuts are made with the saw blade at its mid or 45° position of rotation caused by extension of only one of the rods 57 in each back-to-back pneumatic cylinder pair 55 and 56.

The means for effecting this adjustment of the cutting device 41 includes a slide plate 65 connected through the two pivot elements 32 to the control arm 30, FIG. 11. The slide plate 65 has a pair of spaced parallel bracket plates 66 fixed thereto and projecting from its forward face. A pair of spaced parallel guide rods 67 at right angles to the bracket plates 66 are secured to the latter at 67′. The bracket plates 66, FIG. 8, carry pairs of adjustable and lockable screw stops 68. Another slide plate 69 fixed to the frame bar 42 and parallel to the plate 65 has rearwardly projecting parallel bracket plates 70 rigid therewith which are slidably engaged through bushings 71 with the two guide rods 67.

A pneumatic cylinder 72 whose axis is parallel to the guide rods 67 has its cylinder end fixed to one bracket plate 70 and has its rod 73 secured by a bolt means 74 to one bracket plate 66. This pneumatic cylinder 72 serves to shift the slide plate 69 secured to the frame bar 42 toward the pivot axis 33, FIG. 5, the amount of movement being precision controlled by the screw stops 68.

Also shown in FIG. 11 are clamping bars 75, secured to the control arm 30 by bolts 76 and spacers 77. The clamping bars 75 are disposed rearwardly of sector gear 25 and carry wear pads 78. Clamping pins 79 are retained in apertures 80 of the control arm 30, and are acted on by wedges 81 disposed between the control arm and the slide plate 65. The wedges 81 are extended and retracted by a small pneumatic cylinder 82 operatively connected therewith. Reaction pads 83 fixed to the slide plate 65 in opposing relationship to the clamping pins 79 engage the faces of the wedges 81 nearest the slide plate 65, while the other faces of the wedges engage the clamping pins 79. When the wedges are extended by the cylinder 82, the clamping pins 79 are driven into positive contact with sector gear 25, which is then held rigidly between the clamping pins and wear pads 78. This arrangement prevents relative movement between the slide plate 65 and sector gear 25 caused by clearances in the pantograph linkage 31. Such relative movement, if allowed to occur, would result in inaccurate cutting of the lumber components 64 by the saw blade 35.

Figure 3:
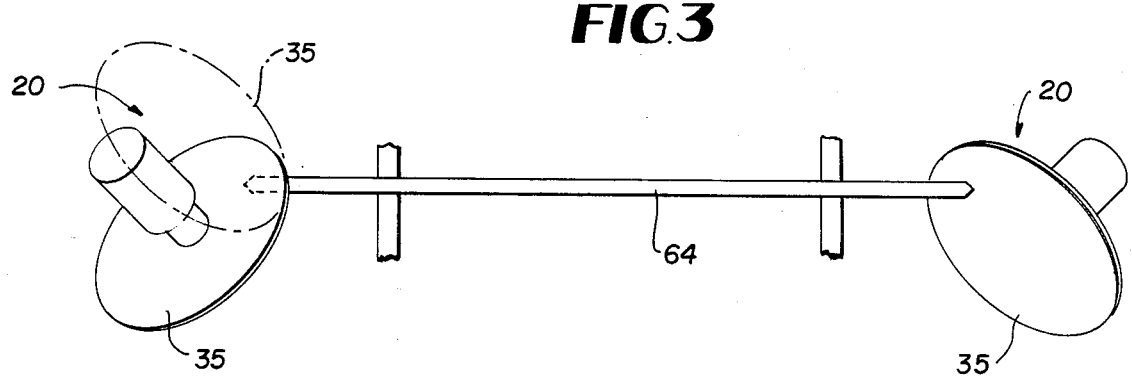
FIG. 3 is a partly schematic plan view showing the simultaneous formation of compound angle cuts by two saw blades in accordance with the invention as embodied in a previously patented lumber component cutting apparatus.

The lumber components 64, FIG. 12, are advanced to the cutting station for cutting by the saw blades 35, FIGS. 3 and 4, by a conveyor system 84. In U.S. Pat. No. 4,316,400, the conveyor system operates continuously to transport lumber components through the saws, which produce simple angle cuts. The patented apparatus does not produce compound angle cuts, as previously explained. The present invention, which is primarily used for making compound angle cuts on hip, valley and jack rafters, requires intermittent operation of the conveyor 84, so that the components 64 are held stationary during each cutting cycle of the saw blade 35 in two directions along the guide rods 52, following which the conveyor advances the next component 64 to the cutting station where it is held stationary during the cutting cycle of the saw blade 35.

The conveyor system 84 comprises endless drive chains 85, operated by a power source 86 having an output shaft 87, FIG. 13. Spaced lugs 88 on the conveyor chains advance the lumber components 64 toward a stop 89, operated by a pneumatic cylinder means 90, FIG. 12.

An overrunning clutch assembly 91 embodies a pair of overrunning clutches 92, such as Torrington FCB-30(4) overrunning clutches. These clutches form an intermittent drive between the power source output shaft 87 and the drive shaft 93 operatively connected to the conveyor chains 85.

A gear 94 is attached to one overrunning clutch 92, FIG. 3. A pair of pneumatic cylinders 95, FIG. 12, are connected to a length of roller chain 96 which is engaged with the gear 94. The pneumatic cylinders 95 alternately pull the chain 96, causing the gear 94 to rotate first in one direction and then in the opposite direction. One such direction of rotation of the gear 94 causes the clutch 92 to lock up so that the conveyor drive shaft 93 will turn with the output shaft 87. Opposite rotation of the gear 94 releases the overrunning clutch 92 so there is no driving or turning of the shaft 93. A bearing 97 supports the clutch housing 91, and another bearing 98 mounts the unit 91 on conveyor drive shaft 93.

The lumber components 64 are periodically advanced against the stop 89, where the saw blade 35 performs the required compound angle cut or cuts, depending upon which type of rafter is being processed. Conventional electrical interlocking controls, not shown, prevent the saw carriage 50 from traveling along the guide bars 52 under influence of the cable 47 until all conditions are ready. When cutting jack rafters, the saw blade 35 makes only one cut. The controls can be programmed so that alternate jack rafters are cut as lefts and rights, as customarily required, or the controls may dictate cutting all left hand or all right hand jack rafters.

FIGS. 3 and 4 depict the cutting of hip rafters by a pair of the saw blades 35 on a pair of the apparatuses 20 installed on the apparatus of U.S. Pat. No. 4,316,400. The most common usage of the present invention will be in connection with this patented apparatus to enable the same to make compound angle cuts as well as simple angle cuts, as the patented apparatus is presently constructed to do. However, as previously noted, the present invention embodied in the apparatus 20 is self-contained and may be employed in different environments and is not limited in use to the environment of U.S. Pat. No. 4,316,400. Neither is the invention limited in its usage to the particular conveyor means 84 shown in FIG. 12. The means by which each lumber piece is presented to the saw blade 35 is, in fact, incidental to the heart of the invention which is embodied in the appartus 20 and more particularly the rafter cutting device 41, FIG. 5.

Figure 1:
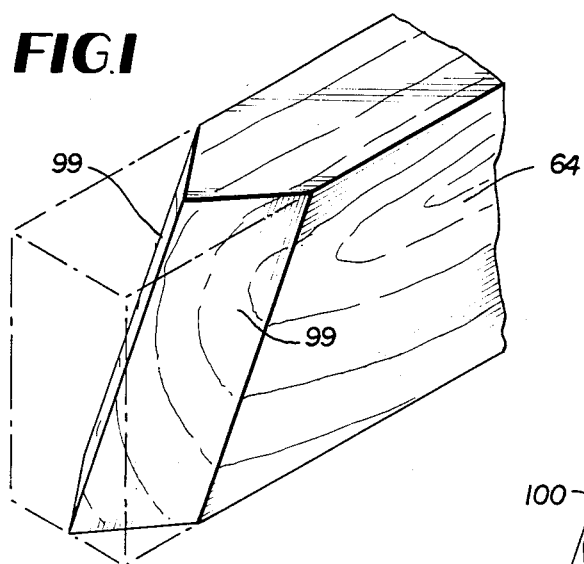
FIG. 1 is a fragmentary perspective view of one end portion of a hip rafter having compound angle cuts formed in accordance with this invention.

FIG. 1 of the drawings depicts one end portion of a hip or valley rafter produced from one of the lumber components 64 and having two compound angle cuts 99 shown on one of its ends, these cuts being produced by the saw blade 35 during two passes in reverse directions along the guide bars 52 under influence of cable 47 and with the saw blade adjusted by the tandem cylinders 55 and 56 to the two positions shown in FIG. 6, one position for each pass of the saw blade.

Figure 2:
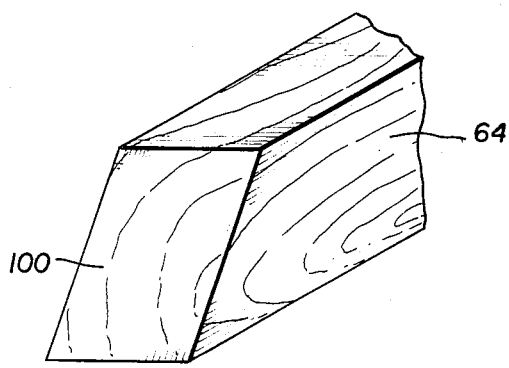
FIG. 2 is a similar view showing one end portion of a jack rafter having a single compound angle cut formed by a saw blade in accordance with the invention.

FIG. 2 shows one end of a jack rafter formed from one of the lumber components 64, there being a single compound angle cut 100 on the end of the jack rafter produced by one pass of the saw blade 35 along the guide rods 52 while being adjusted in one of its two angular positions. It should be understood that one saw blade 35 will act simultaneously on each end of a lumber component 64, FIGS. 3 and 4, when twin apparatuses 20, FIG. 5, are utilized as in the cutting apparatus of U.S. Pat. No. 4,316,400.

The cutting sequence for cutting a hip or valley rafter is for the lumber component 64 to be moved to the cutting station and held firmly against the lumber stop 89. The screw shaft 27 is operated to position the pivot axis 33 in the plane defined by the top of the conveyor 84. The control arm 30 is driven by motor 36 to set the protractor pointer 40 at the proper position on the protractor scale of sector gear 25 to establish the roof slope angle for which the hip or valley rafters are being cut. Pneumatic cylinders 55 and 56 are fully retracted to position the saw blade 35 in one of its 90° positions, FIG. 6. Cable pneumatic cylinder 44 is operated to cause saw carriage 50 to travel from top to bottom of guide rods 52 and frame member 42. Pneumatic cylinders 55 and 56 are then fully extended rotating saw blade 35 90° to its second position shown in FIG. 6. Pneumatic cylinder 44 now causes the saw carriage 50 to travel from the bottom to the top of guide bars 52 producing the second compound angle cut on the lumber component 64 as shown by the numeral 99 in FIG. 1, the first compound angle cut having been made during the movement of the saw carriage 50 from the top to the bottom of the guide bars 52.

The cutting cycle now being complete, the stop 89 is retracted and the properly cut hip or valley rafter is transported away from the cutting station. The stop 89 is returned to its active position ready to block and hold the next oncoming lumber component 64 during the cutting cycle, as above described.

The cutting sequence can be set so that the saw blade 35 travels top-down, bottom-up, top-down-up, or bottom-up-down, with or without the angle of the saw blade 35 being changed by the cylinders 55 and 56, either at the top or bottom of the saw guide structure, to enable cutting of left or right jack rafters and hip and valley rafters.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A hip, valley and jack rafter cutting apparatus comprising a primary support, a control arm, means mounting the control arm on the primary support for movement along a linear path and for rotation around a pivot axis which is perpendicular to the linear path, a rafter cutting device bodily mounted on the control arm to move therewith and including a linear guideway, a saw carriage including a power driven rotary saw blade mounted on the linear guideway, power means to propel the saw carriage in opposite directions along the linear guideway, additional power means on the rafter cutting device to rotate the linear guideway and saw carriage in opposite directions around a pivot axis parallel to the axis of the linear guideway and perpendicular to the first-named pivot axis, and means to position lumber components in succession fixedly at a cutting station with corresponding longitudinal edges of the lumber components lying in a plane parallel to the first-named pivot axis.

2. A hip, valley and jack rafter cutting apparatus as defined in claim 1, and another power means connected between said control arm and rafter cutting device and being operable to shift the rafter cutting device bodily on a linear path toward and away from the first-named pivot axis when the linear guideway and saw carriage are in an intermediate rotated position around said pivot axis parallel to the axis of the linear guideway.

3. A hip, valley and jack rafter cutting apparatus as defined in claim 1, and said means mounting the control arm on the primary support comprising a linear guide on the primary support, a sector gear adjustably mounted on the linear guide and adapted to travel longitudinally thereof in opposite directions, and another power means on the control arm incuding a pinion gear drivingly engaged with the sector gear.

4. A hip, valley and jack rafter cutting apparatus as defined in claim 3, and the control arm forming a part of a pantograph linkage anchored to said sector gear.

5. A hip, valley and jack rafter cutting apparatus as defined in claim 1, and a hydraulic motor secured to said saw carriage and operatively connected to the rotary saw blade to drive the latter.

6. A hip, valley and jack rafter cutting apparatus as defined in claim 1, and the first-named power means comprising a pneumatic cylinder on the linear guideway extending longitudinally thereof, a free piston in the pneumatic cylinder, and a flexible element connected between the free piston and saw carriage.

7. A hip, valley and jack rafter cutting apparatus as defined in claim 1, and said additional power means comprising pairs of back-to-back cylinders on the rafter cutting device near its ends having independently operable extensible and retractable rods connected between a frame member of the rafter cutting device and pivoted crossheads of said linear guideway.

8. A hip, valley and jack rafter cutting apparatus as defined in claim 7, and the linear guideway comprising a pair of spaced parallel guide bars connected between the pivoted crossheads and being guidingly engaged with said saw carriage.

9. A hip, valley and jack rafter cutting apparatus as defined in claim 6, and guide sheave means on opposite ends of the rafter cutting device engaged with said flexible element to maintain the flexible element in a loop form between said free piston and saw carriage.

10. A hip, valley and jack rafter cutting apparatus as defined in claim 1, and the last-named means comprising a lumber component conveyor to advance lumber components in succession to said cutting station, and a movable stop element to arrest movement of each lumber component at the cutting station during the cutting cycle of the rotary saw blade.

11. A hip, valley and jack rafter cutting apparatus as defined in claim 10, and an overrunning clutch means connected in the power drive means of said conveyor, whereby the conveyor can operate intermittently or continuously.

12. A hip, valley and jack rafter cutting apparatus comprising a primary support, a control arm mounted on the primary support for movement thereon in a linear path and in a circular path around a pivot axis which is perpendicular to the linear path, a rafter cutting device attached to the control arm and including a linear guideway which is pivoted to said device on an axis parallel to the axis of the linear guideway, a saw carriage including a power-driven saw blade mounted on the linear guideway, and means on the rafter cutting device to turn the linear guideway on its pivot axis to position the saw blade in a first cutting position and to propel the saw carriage in one direction along the linear guideway to make a first compound angle cut through a lumber component and to then turn the linear guideway on its pivot axis in an opposite direction to position the saw blade in a second cutting position and to propel the saw carriage in an opposite direction along the linear guideway to make a second compound angle cut through the lumber component.

13. A hip, valley and jack rafter cutting apparatus as defined in claim 12, and said means comprising a first means on the rafter cutting device to turn the linear guideway on its pivot axis in opposite directions and a second and independent means on the rafter cutting device to propel the saw carriage in opposite directions along the linear guideway.

14. A hip, valley and jack rafter cutting apparatus as defined in claim 13, and the first means comprising at least a pair of back-to-back coaxial pneumatic cylinders having oppositely extending rods which can be fully retracted or fully extended simultaneously or extended or retracted individually, and said rods being connected with the linear guideway and with a relatively stationary part of the rafter cutting device.

15. A hip, valley and jack rafter cutting apparatus as defined in claim 13, and the second and independent means comprising a pneumatic free piston cylinder unit on the rafter cutting device having an axis parallel to the axis of the linear guideway, and a flexible element connected between the free piston of said cylinder unit and said saw carriage.

16. A hip, valley and jack rafter cutting apparatus as defined in claim 12, and means to position and hold lumber components at a cutting station while said saw blade is making said first and second compound angle cuts.

17. A hip, valley and jack rafter cutting apparatus comprising a primary support, a control arm mounted on the primary support for controlled movement along linear and circular paths, a rafter cutting device bodily mounted on the control arm to move therewith along said paths, a pivoted linear guideway on the rafter cutting device, a saw carriage including a powered rotary saw blade on the pivoted linear guideway, a power means on the rafter cutting device to turn the pivoted linear guideway on its pivot axis substantially 90° in opposite directions, and another power means on the rafter cutting device to propel the saw carriage rapidly in opposite directions along the linear guideway.

18. A hip, valley and jack rafter cutting apparatus as defined in claim 3, and a drive means on the primary support connected with the sector gear to drive it in opposite directions along the linear guide of the primary support.

19. A hip, valley and jack rafter cutting apparatus as defined in claim 18, and said drive means comprising a screw shaft.

20. A hip, valley and jack rafter cutting apparatus as defined in claim 2, and a power-operated wedge clamping means connected with the control arm and being operable to eliminate play caused by clearances in a pantograph linkage connected between said control arm and said means mounting the control arm on the primary support.

* * * * *